July 9, 1929.  J. L. DRAKE  1,720,546
GLASS CUTTING APPARATUS
Filed Jan. 30, 1925  2 Sheets-Sheet 1

INVENTOR.
John L. Drake.
BY Frank Fraser
ATTORNEY.

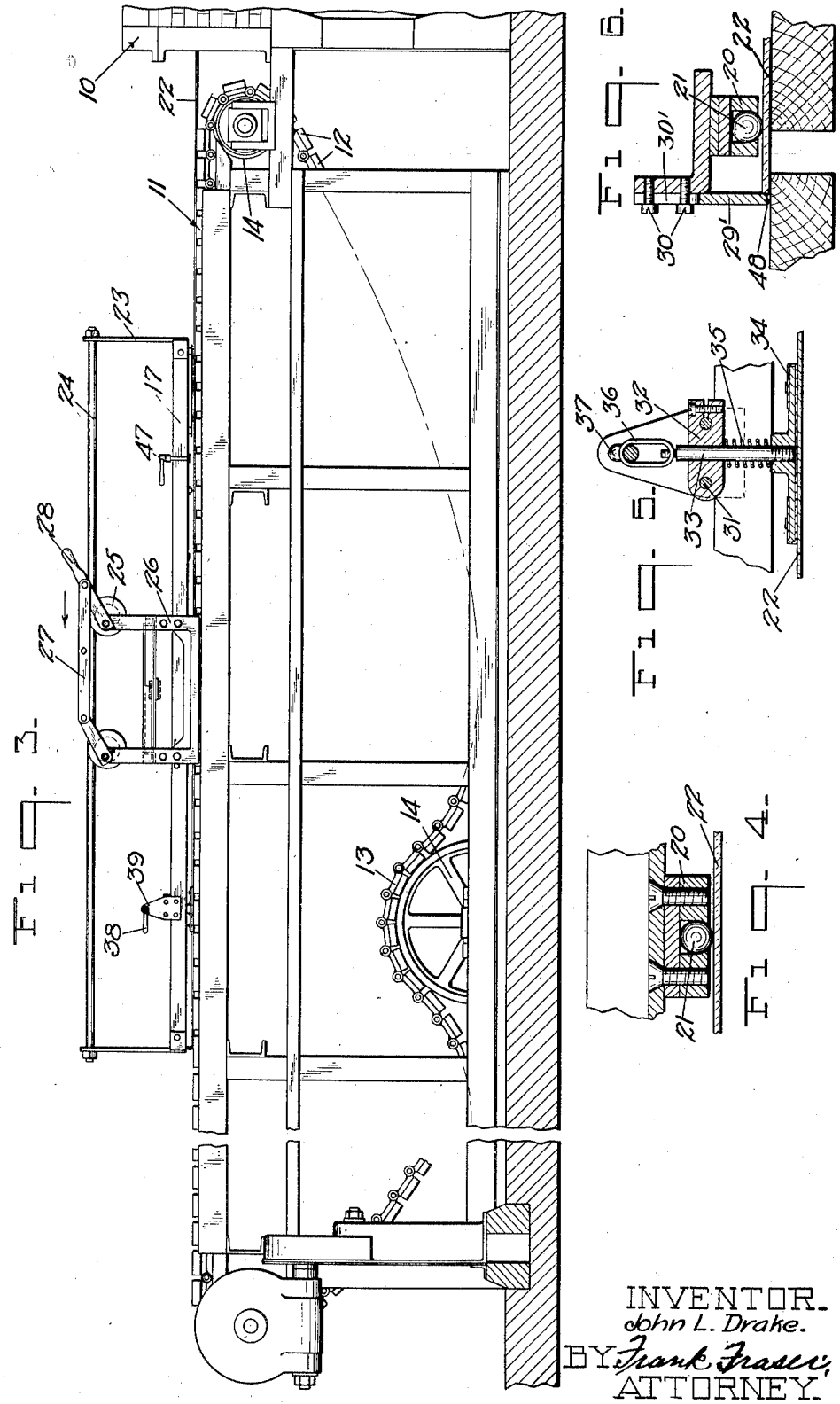

Patented July 9, 1929.

1,720,546

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

GLASS-CUTTING APPARATUS.

Application filed January 30, 1925. Serial No. 5,803.

The present invention relates to sheet glass apparatus, and has particular reference to a cutting mechanism for cutting a ribbon of glass into sheet lengths.

An important object of the invention is to provide an apparatus for the cutting of glass wherein the sheet is scored transversely thereof parallel to the preceding cut.

A further object of the invention is to provide a cutting mechanism wherein a saving of glass will be accomplished by cutting the glass in sheet lengths in a manner that both ends of the sheet will be parallel to each other.

A still further object of the invention is to provide a movable frame member adapted to be placed upon the glass to be cut in a manner that the frame will be lined up squarely with the sheet, and includes means for guiding a cutting or scoring implement transversely of the sheet, the said score being parallel to the preceding cut.

A still further object of the invention is to provide a glass cutting mechanism including a stationary support having a movable frame associated therewith, said frame being adapted to be frictionally engaged and movable with the sheet, and having an adjustable cutter guide for permitting a transverse score being made upon the glass to be cut in a manner that the sheet cut will be a regular rectangular sheet, the sides thereof being parallel to each other.

Other objects and advantages of the invention will become apparent during the course of the following description.

In the drawings wherein like numerals are employed to designate like parts throughout the same.

Fig. 3 is a side elevation illustrating the device in connection with the cutting end of the sheet glass drawing apparatus.

Fig. 4 is a section on line 4—4 of Fig. 1,

Fig. 5 is a section on line 5—5 in Fig. 1, and

Fig. 6 is a section on line 6—6 in Fig. 1.

Figure 1:
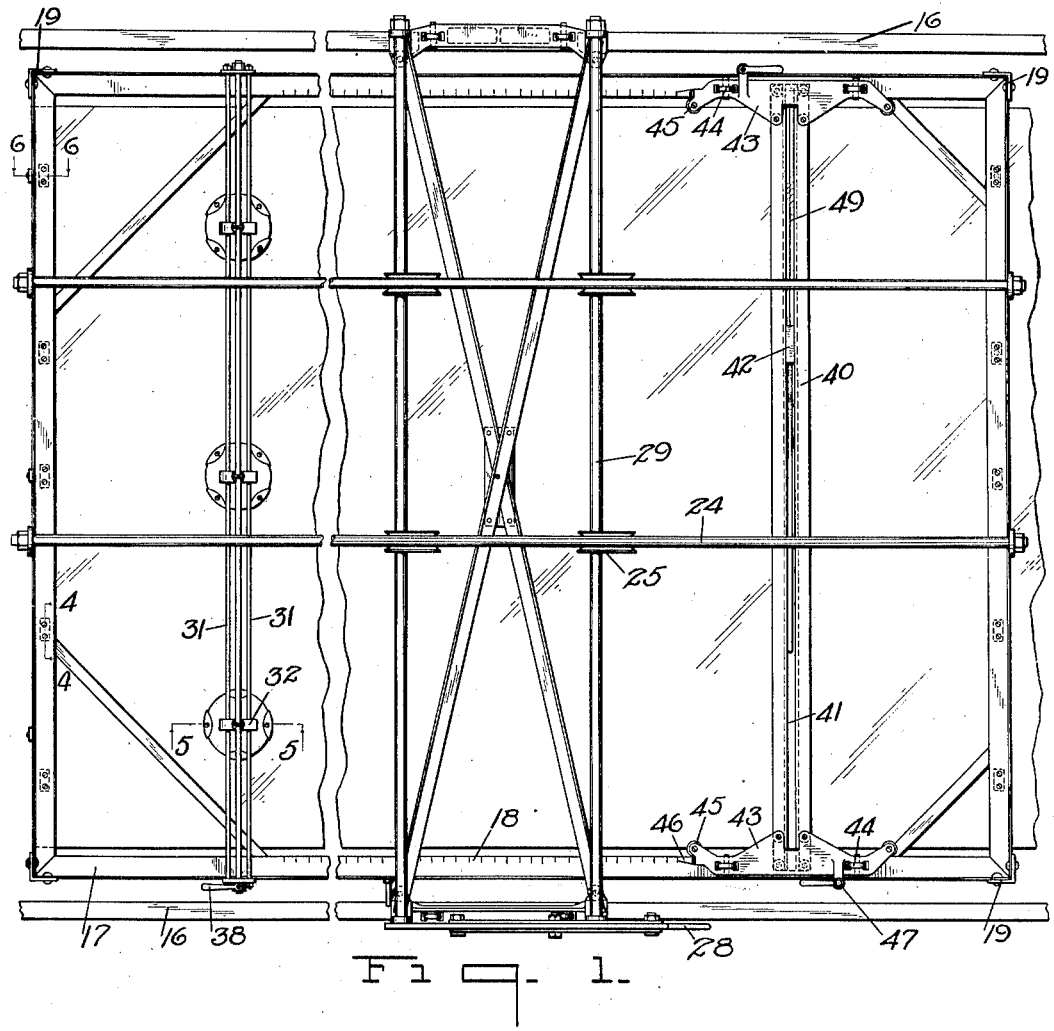
Fig. 1 is a top plan view showing my invention in operative position.
Figure 2:
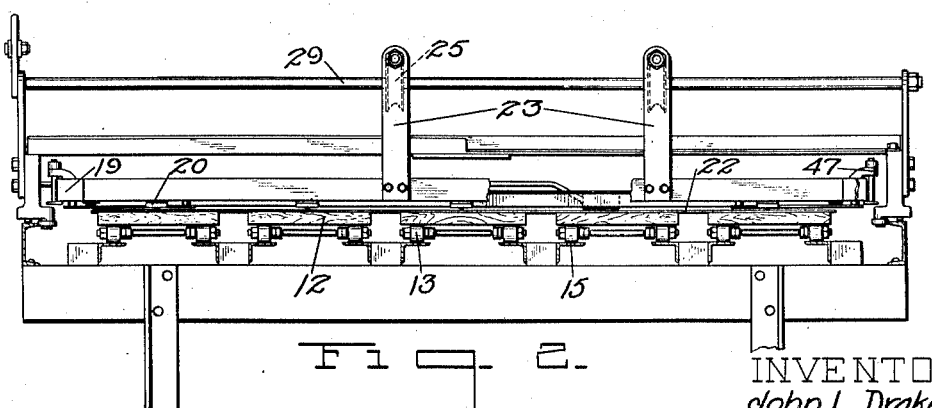
Fig. 2 is an end view thereof.

The invention herein disclosed is particularly well-adapted for use in connection with a continuous glass drawing apparatus, and is shown in the drawing as associated with a sheet being moved in a horizontal plane. Heretofore, in this type of apparatus, the sheet has been moved over a so-called cutting table where an operator scores the sheet transversely with a hand implement. The type of sheet thus cut from the ribbon of glass largely depends upon the skill of the particular operator making the cut. In view of the fact that the sheet is continuously moving, it is difficult to make an absolutely straight score across the sheet which is parallel to the preceding cut or at right angles to the edges thereof. In those instances where the score is not parallel to the preceding cut or at right angles to the edges of the sheet a considerable waste is had when truing the sheet up to smaller sheets for commercial use.

In the present invention it is the aim to make it possible to score a ribbon of glass transversely in a manner that the score will be parallel to the preceding cut and also at right angles to the edges of the sheet so that no waste will be occasioned because of loss in scoring up of an uneven sheet.

In the drawings wherein for the purposes of illustration is shown the prefered embodiment of the invention, the numeral 10 designates a sheet glass apparatus in its entirety, and has associated with it the cutting table 11, which ordinarily comprises a plurality of wooden blocks 12 connected by link means 13 to form an endless belt movable over suitable drums 14. The links 13 ride upon rails or tracking means 15.

The cutting table also includes stationary beams 16 along both sides thereof as clearly shown in Fig. 1.

My invention comprises a movable frame 17 which is rectangular in conformation, and is provided with the graduations 18 along its edges as shown in Fig. 1. Of course the frame may be braced and made rigid as by angle irons 19 at its ends as desired. Arranged on the lower faces of the frame 17 are casters 20 each having a ball 21 which may be placed upon the sheet 22 being drawn from the machine 10. The balls 21 may be permitted to rest upon the sheet and moved thereover without damage thereto.

Rising from the ends of the frame 17 are the members 23 adapted to support rods 24 extending longitudinally of the frame and arranged in spaced parallel relation to each other. The rods 24 are supported upon eccentrically mounted grooved discs 25. The eccentrically mounted rollers 25 are rotatably supported, and are connected by a link mechanism 27 operable by means of the handle 28, whereby the eccentrically mounted rollers 25 may be rotated upon that pivot, thus raising or lowering the rods 24 and frame 17. It is to be understood that the eccentrically mounted rollers 25 are carried by the shafts 29 arranged transversely of the apparatus and journaled in the support 26 as has been pointed out. The rolls are preferably grooved so that the rods 24 will not slip therefrom when in use.

When the rods or wheels 25 are in the position as shown in Fig. 3, the frame 17 is in a lowered position and in contact with the sheet. After the handle is moved in the direction of the arrow in Fig. 3, due to the eccentricity of the wheels 25, the rods and frame will be moved upwardly and out of contact with the said sheet. When in a raised position the frame may be moved to or from the apparatus 10, being supported solely by the rods 24 upon the rolls 25.

One end of the frame 17 is provided with adjustable fingers 29' which are supported and maintained in adjustment by the cap screws 30 passing through the slot 30'. The fingers are adapted to engage the outer end of the sheet 22 as is clearly shown in Fig. 6. They may be adjusted to suit the thickness of sheet being scored. When the apparatus is in a position as shown in Fig. 3, and the fingers 29' engage the end of the sheet as shown in Fig. 6, the frame will be moved with the sheet by reason of the sheet engaging the fingers and moving the frame along.

To assist in preventing relative movement between the sheet and frame, transverse rods 31 are carried by the frame, and are adapted to receive blocks 32 through which pass shafts 33, having at one end a felt-covered pad or foot 34 which is in the nature of a large disc. The disc may be metal or wood and faced with a suitable protective coating such as felt or the like to prevent damage to the sheet when in contact therewith. A spring 35 is interposed between the blocks 32 and the plate or foot 34 to normally urge the same downwardly. The shaft 33 is carried by a link 36, which is supported upon a crank-shaft 37, which is operable by means of a handle or lever 38. The lever 38 is positioned at the operating side of the machine and is restricted in its movement by small pins 39 shown in Fig. 3. Upon movement of the lever 38 from one side to the other the crank-shaft is locked, thus raising or lowering the padded foot 34 to engagement with the sheet. The sheet and frame are thus frictionally connected to prevent relative movement therebetween.

In Fig. 1 is clearly shown the guide means 40 which comprises the transversely arranged members disposed in parallel spaced relationship, forming a groove 41 through which a suitable scoring or cutting implement may be moved. The guide means 40 is supported at its ends by the carriages 43, which are supported upon the wheels 44 journaled therethrough. To prevent transverse shifting of the guide 40, wheels 45 are adapted to engage the inner edge of the side members of the frame 17 while the wheels 44 are permitted to ride upon the top surface thereof which forms a suitable track. Pointer means 46 are carried by the carriage 43 to cooperate with the scale 18 so that any desired size of sheet can be accurately cut from the ribbon 22. It will be seen that the guide member 40 is movable longitudinally of the frame depending upon the size of sheet desired. A cammed locking member 47 is provided to clamp the guide portion in the desired adjustment so that it will be prevented from moving during the cutting operation.

Thus to cut a sheet from the ribbon 22, the frame is lifted upwardly and slid to stationary support until the fingers 29' are above the cut end 48 of the sheet after which the frame is lowered so that the said fingers will abut the said end. The frictional engaging means 34 are then lowered into position by operating the lever 38 to permit the said feet to move downwardly by action of the springs 35. After the sheet and frame are frictionally engaged to prevent relative movement the guiding mechanism 40 is adjusted for the length of sheet desired, after which the scoring implement or cutter 42 may be moved through the slot 41 to properly score the sheet. As the fingers 29' will accurately line up the movable frame with the end of the sheet, the cut or score 49 will be parallel thereto and at right angles to the edges of the sheet, assuming that care has been taken in making the first cut. After the sheet has been scored as described, the foot is released and the frame is raised and moved into position for the next cut.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass cutting apparatus, means for supporting a moving sheet of glass, a stationary support, a movable frame carried thereby and arranged above the sheet, means carried by the frame for engagement with the free end of the moving sheet to be cut for effecting movement of said frame therewith, and a cutter guide carried by said frame and extending across said sheet.

2. In sheet glass cutting apparatus, means for supporting a moving sheet of glass, a support, a frame carried by said support and adapted at times to rest upon said sheet, means whereby the frame may be freely moved longitudinally upon the sheet to position the same, means carried by the frame and engaging the sheet to prevent relative movement therebetween after said frame has been positioned, a cutter guide carried by the frame and extending across the sheet, and means for moving the frame into and out of contact with said sheet.

3. In sheet glass cutting apparatus, means for supporting a moving sheet of glass, a stationary support, a movable frame carried thereby and arranged above the sheet, means carried by said support for moving the frame to and from said sheet to be cut, means carried by the frame for engaging the free end of the sheet when the frame is in lowered position to effect movement thereof with said sheet, and means carried by the frame for guiding a cutting implement across the sheet.

4. In sheet glass cutting apparatus, means for supporting a moving sheet of glass, a stationary support, a frame associated therewith and movable with said sheet, a plurality of members carried by the frame for frictionally engaging said sheet, means for moving said gripping members into and out of engagement with said sheet independently of said frame, and means carried by said frame for guiding a scoring tool across the sheet.

5. In sheet glass cutting apparatus, means for supporting a moving sheet of glass, a stationary support, a frame associated therewith and movable with said sheet, means for moving the frame to and away from the moving sheet, a cutter guide carried by said frame and movable horizontally with respect thereto, and means for locking said guide to said frame.

6. In sheet glass cutting apparatus, means for supporting a moving sheet of glass, a stationary support, a frame associated therewith and movable with said sheet, means for moving the frame to and away from the moving sheet, a cutter guide carried by the frame and movable horizontally with respect thereto, and means carried by said cutter guide and engaging said frame for preventing transverse shifting movement of the former with respect to the latter.

7. In sheet glass cutting apparatus, means for supporting a moving sheet of glass, a stationary support, a frame carried thereby so as to be movable with said sheet, said frame being provided with a series of graduations, a cutter guide carried by said frame and movable horizontally with respect thereto, and indicating means carried by said guide and cooperating with said graduations so that the size of sheet to be cut may be determined.

8. In sheet glass cutting apparatus, means for supporting a moving sheet of glass, a stationary support, a frame carried by said support and movable horizontally relatively thereto, means carried by the support for raising and lowering the frame relative to said sheet, means carried by and arranged at the forward end of said frame and engageable by said sheet to cause said frame to travel therewith, and means carried by said frame for guiding a scoring tool across the sheet.

9. In sheet glass cutting apparatus, means for supporting a moving sheet of glass, a stationary support, a movable frame carried thereby and arranged above the sheet, and a cutter guide carried by the frame, said cutter guide extending transversely across the sheet and adjustable horizontally with respect to said frame.

10. In sheet glass cutting apparatus, means for supporting a moving sheet of glass, a stationary support, a movable frame carried thereby and arranged above the sheet, means carried by the frame for engagement with the free end of the sheet to be cut for effecting movement of the frame therewith, a cutter guide carried by the frame and extending across said sheet, and means for adjusting the cutter guide horizontally with respect to said frame.

11. In sheet glass cutting apparatus, means for supporting a moving sheet of glass, a stationary support, a frame carried thereby and movable with the sheet, means for raising and lowering said frame relative to said sheet, means carried by said frame for frictionally engaging said sheet, and means for raising and lowering said frictional engaging means independently of said frame.

12. In sheet glass cutting apparatus, means for supporting a moving sheet of glass, a stationary support, a movable frame carried thereby and arranged above the sheet, means carried by the frame for engagement with the free end of the moving sheet to be cut for effecting movement of said frame therewith, a cutter guide carried by the frame and extending across said sheet and adjustable horizontally with respect to said frame, means for raising and lowering the frame relative to said sheet, means carried by said frame for frictionally engaging said sheet, and means for raising and lowering said last-named means independently of said frame.

Signed at Toledo, in the county of Lucas, and State of Ohio, this 27th day of January, 1925.

JOHN L. DRAKE.